United States Patent [19]
Mori et al.

[11] Patent Number: 4,782,629
[45] Date of Patent: Nov. 8, 1988

[54] AUTOMOBILE WINDOW GLASS ASSEMBLY

[75] Inventors: Keiji Mori, Kariya; Keiici Ishida; Kenji Ono, both of Toyota, all of Japan

[73] Assignees: Aisin Seiki Kabushiki Kaisha, Kariya; Toyota Joshida Kabsuhiki Kaisha, Toyota, both of Japan

[21] Appl. No.: 170,050

[22] Filed: Mar. 17, 1988

Related U.S. Application Data

[63] Continuation of Ser. No. 907,794, Sep. 16, 1986, abandoned.

[30] Foreign Application Priority Data

Sep. 26, 1985 [JP] Japan ................................ 60-145789

[51] Int. Cl.$^4$ ............................................. E05D 15/16
[52] U.S. Cl. ........................................ 49/428; 49/440; 49/502
[58] Field of Search ................. 49/428, 431, 436, 374, 49/502, 440

[56] References Cited

U.S. PATENT DOCUMENTS

| | | | |
|---|---|---|---|
| 4,069,617 | 1/1978 | Koike | 49/374 X |
| 4,417,419 | 11/1983 | Rossie et al. | 49/502 X |
| 4,503,639 | 3/1985 | Rossie et al. | 49/374 |
| 4,593,494 | 6/1986 | Ono et al. | 49/502 X |

*Primary Examiner*—Philip C. Kannan
*Attorney, Agent, or Firm*—Finnegan, Henderson, Farabow, Garrett & Dunner

[57] ABSTRACT

An automobile window glass assembly for raising and lowering a window glass set in a door of an automobile includes a pair of guide rails secured to the door and having a longitudinally extending groove for guiding two opposing edges of the window glass. Guide rollers are secured to the two opposing edges of the window glass for being raised and lowered along corresponding ones of the guide rails. Each of the guide rollers includes a cylindrical roller consisting of a synthetic resin and secured to the head of a shaft fixed to the window glass, and a cap fitted into an open end portion of the cylindrical roller and having a freely elastically deformable portion contacting a surface of the groove of the corresponding guide rail at all times to assure that the window glass will not develop looseness or play in the direction of door width.

4 Claims, 3 Drawing Sheets

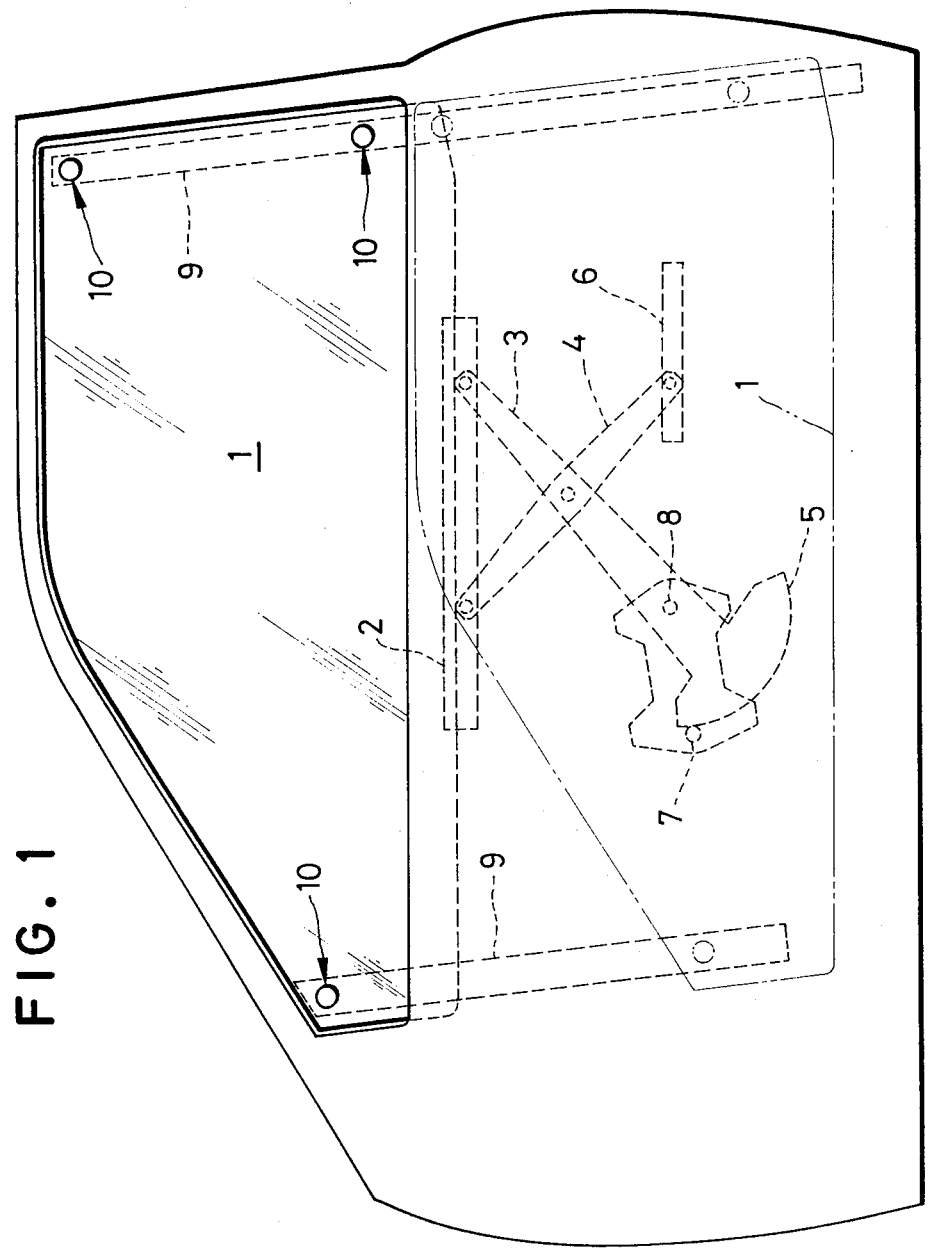

AUTOMOBILE WINDOW GLASS ASSEMBLY

This application is a continuation of application Ser. No. 907,794, filed Sept. 16, 1986, abandoned.

BACKGROUND OF THE INVENTION

1. Field of the Invention

This invention relates to an automobile window glass assembly, particularly an assembly that prevents an automobile window glass from looseness or play in the lateral direction of the vehicle.

2. Description of the Prior Art

As shown in FIG. 1, a mechanism for raising and lowering an automobile window glass 1 includes a lift arm bracket 2 secured to a lower edge portion of the glass 1, a lift arm 3 and a synchronizing arm 4 crossing each other and having one end slidably mounted in a guide groove of the bracket 2, a sector gear 5 secured to the other end of the lift arm 3, and an arm bracket 6 on the side of a door, the other end of the synchronizing arm 4 being slidably mounted in a guide groove of the arm bracket 6. The sector gear 5 is in meshing engagement with a gear 7 secured to a rotary shaft that is operated manually or powered by a motor. Rotating the gear 7 causes the lift arm 3 to pivot about a fulcrum 8 to raise and lower the window glass 1.

Guide rails 9 are secured to the side of the door at both opposing edges of the glass 1. Guide rollers 10 are secured to both ends of the window glass 1 and are slidably fitted into each of the guide rails 9. When the window glass 1 is raised and lowered by the lift arm 3, the glass 1 is guided by the guide rollers 10 so that movement of the glass 1 follows a prescribed path.

An example of the guide roller 10 employed in the prior art is shown in FIG. 2. The details of this arrangement are disclosed in the specification of Japanese Patent Application Laid-Open (Kokai) No. 58-164421. The guide roller 10 includes a cylindrical roller 12 formed of synthetic resin and secured to the head of a shaft 11 secured to the window glass 1, and a cap 13 disposed in an opening of the roller and secured to the head of the shaft 11.

The guide roller 10 has a dimension h within the groove of the guide rail 9, and the groove itself has a dimension H. In the prior-art arrangement shown in FIG. 2, it is designed so that the difference H-h between these two dimensions takes on a positive value, i.e., so that some clearance is left between the wall of the cap 13 and the wall of the groove in the guide rail 9. In other words, if the value of the difference H-h were to be negative, the cap 13 would offer large sliding resistance, thus requiring a large force to raise and lower the window glass 1. To avoid this, therefore, the dimensions are selected so that the difference H-h will be positive. However, owing to the clearance between the cap 13 and the wall of the groove, the window glass 1 vibrates laterally of the vehicle, or up and down in the view of FIG. 2. This constitutes a disadvantage encountered in the prior art arrangement.

SUMMARY OF THE INVENTION

Accordingly, an object of the present invention is to provide an automobile window glass assembly free of the foregoing disadvantage encountered in the prior art.

According to the present invention, the foregoing object is attained by providing an automobile window glass assembly for raising and lowering a window glass set in a door of an automobile, comprising a pair of guide rails secured to the door and having a longitudinally extending groove for guiding two opposing edges of the window glass, guide rollers secured to the two opposing edges of the window glass for being raised and lowered along corresponding ones of the guide rails, and a shaft provided for each of the guide rollers and secured to the window glass, the shaft having a head. Each of the guide rollers includes a cylindrical roller consisting of a synthetic resin and secured to the head of the shaft, the cylindrical roller having an open end portion, and a cap fitted into the open end portion of the cylindrical roller and having a portion contacting a surface of the groove of the corresponding guide rail, the portion being freely elastically deformable.

Since the portion of the cap contacting the groove surface of the guide rail is elastically deformable, the two can be kept in contact at all times. In addition, the margin of interference between the cap and the guide rail groove surface is absorbed by the deformation of the elastic cap. Accordingly, even if the guide roller sustains wear owing to the contact with the guide rail, the elastic deformation of the cap prevents looseness, play and vibration axially of the shaft.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a front view illustrating a mechanism for raising and lowering an automobile window glass;

DESCRIPTION OF THE PREFERRED EMBODIMENT

Figure 4:
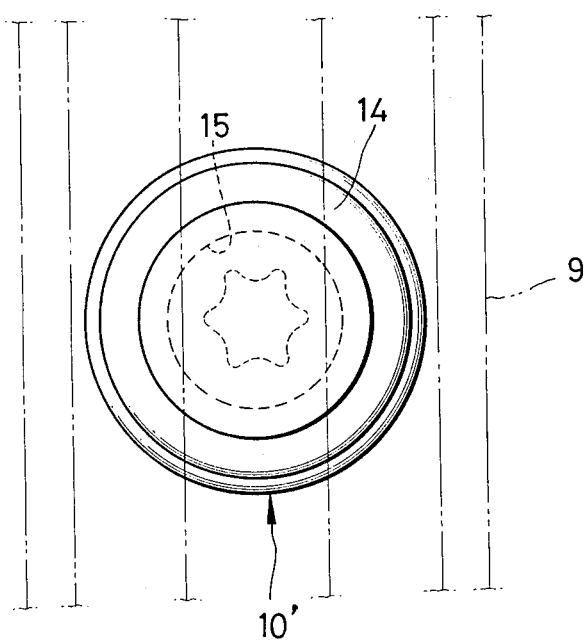
FIG. 4 is a top view of the assembly shown in FIG. 3.
Figure 2:
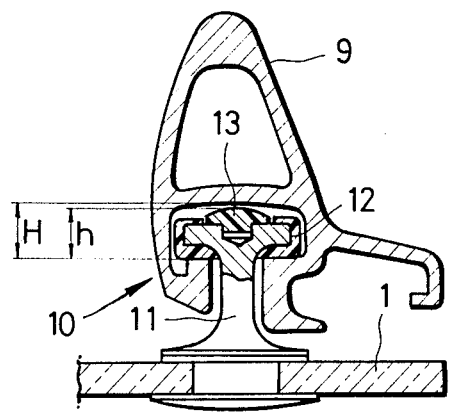
FIG. 2 is a sectional view illustrating a guide roller employed in an automobile window glass assembly according to the prior art.
Figure 3:
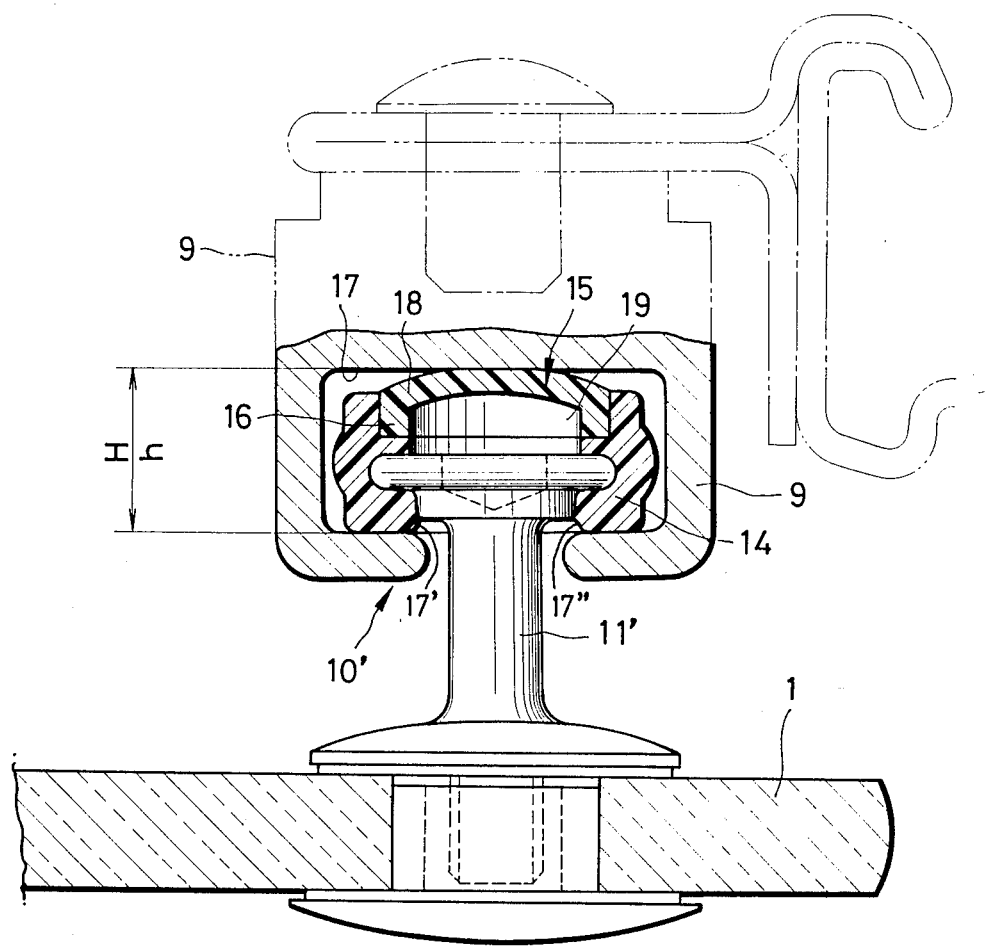
FIG. 3 is a sectional view illustrating a preferred embodiment of an automobile window glass assembly according to the present invention.

A preferred embodiment of an automobile window glass assembly according to the present invention will now be described with reference to FIGS. 3 and 4.

A guide roller 10' has a shaft 11' secured to the window glass 1. A cylindrical roller 14 formed of synthetic resin is insert molded onto a head portion of the shaft 11'. The roller 14 has a cylindrical open end portion extending above the shaft 11' as seen in the view of FIG. 3. The roller 14 has an outer circumferential portion spaced away from the inner circumferential surface of the groove in guide rail 9.

A cap 15 is press fitted into the open end portion of the roller 14 and has an edge portion which comes into abutting contact with a step formed in the roller 14. The cap 15 has a cylindrical portion 16 fitted into the open end portion of the roller 14, and an end wall 18 contacting a groove surface 17 of the guide rail 9. The interior of the cap 15 defines a cavity 19. The cap 15 consists of a synthetic material such as a polyester elastomer and is formed so that at least its end wall 18 is freely elastically deformable.

The groove surface 17 includes opposing end surfaces 17', 17" defining an open section therebetween. As shown in FIG. 3, the shaft 11' extends through the open section. Further, the roller 14 slidably engages the groove surface 17 proximate the opposing end surface 17′, 17″.

The guide groove of the guide rail 9 has a groove height H, and the guide roller 10′ has an axial dimension h. At the design and manufacture of the window glass assembly, H and h are set so that the difference H-h between them will be a negative value. By doing so, the end wall 18 will be in contact with the groove surface 17 of guide rail 9 at all times so that looseness will not develop between them. It should be noted that the margin of interference between the cap 15 and the groove surface 17 is absorbed by the elastic deformation of the end wall 18 of cap 15, and that this elastic deformation assures that the sliding resistance between the guide roller 10′ and the guide rail 9 will not be increased. It also assures that there will be no looseness or play between the guide roller 10′ and the guide rail 9.

Thus, the present invention makes it possible to raise and lower the window glass 1 smoothly without looseness and play between the guide roller 10′ and guide rail 9 in the lateral direction of the vehicle. The fact that the difference between the groove height H and the axial dimension h is a negative value facilitates the fabrication of the cap 15 and the assembly of the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A guide assembly for securely guiding a vehicle window glass between raised and lowered positions comprising:

a guide rail mounted on the vehicle, said guide rail having an interior surface defining a guide groove extending substantially continuously along a length of said guide rail; said interior surface having opposing end surfaces along said guide groove providing an open section therebetween;

a guide shaft attached at a first end to said window glass for positioning said window glass relative to said guide rail, said guide shaft extending through said open section and including a second end supporting guide means disposed within said guide groove for slidably engaging said interior surface, said guide means including a substantially cylindrical roller adapted to be mounted on said second end and having an annular groove along said second end, said roller being frictionally engaged to said interior surface of said guide rail proximate said opposite end sections, said guide means also including a resilient cap member including an annular support member and a cap, said support member being adapted to be attached to said roller along said annular groove of said roller, said cap having an arcuate cross section disposed to engage a portion of said interior surface positioned substantially opposite said open section and to hold said roller in engagement with said guide rail along said interior surface, said cap and said support member defining a cavity extending substantially adjacent said second end, said cap member being elastically deformable along said cavity enabling smooth movement of said guide within said guide rail.

2. The guide assembly defined in claim 1, wherein said guide means is sized to have normal expanded height which, when measured relative to an axis of said guide shaft, is greater than a distance between an imaginary line connecting said opposing end surfaces and the portion of said interior groove surface opposite said open section.

3. The guide assembly defined in claim 1, wherein said cylindrical roller is formed of a resin, said resin being a polyester elastomer.

4. The guide assembly defined in claim 1, wherein said cap member is formed of a resin, said cylindrical portion being press fitted into abutment with said annular groove.

* * * * *